INVENTOR.
CHARLES S. TURNER
BY
Lewis P. Elbinger

Feb. 20, 1968 C. S. TURNER 3,370,183

PULSE SHAPER

Filed Sept. 11, 1964 2 Sheets-Sheet 2

INVENTOR.
CHARLES S. TURNER
BY
Lewis P. Elbinger

United States Patent Office 3,370,183
Patented Feb. 20, 1968

3,370,183
PULSE SHAPER

Charles S. Turner, Dallas, Tex., assignor to General Electric Company, a corporation of New York
Filed Sept. 11, 1964, Ser. No. 395,710
10 Claims. (Cl. 307—264)

ABSTRACT OF THE DISCLOSURE

A pulse-shaping circuit employing a collector-coupled trigger circuit for receiving pulses having variations in shape and for productng pulses having uniform wave shapes.

This invention relates to pulse shaper circuits and more particularly to shaper circuits which are especially suited to reshape electrical signals generated in card readers employed in data processing systems by transforming variously shaped pulses into rectangular pulses whose time durations are essentially constant.

Punched cards and punched tapes are widely used for storing information in electronic data processing systems. Equipment known as card readers and paper tape readers are used for photoelectrically sensing the information from the cards or tapes as they pass between a source of light and a photoelectric reading head. These photoelectric reading heads may employ photoelectric cells or phototransistors to detect the presence or absence of holes in each location of the information bearing medium. The pattern of light and dark falling on the photoelectric reading head develops an electrical signal at the output of the reading head which is intended to be a replica of the pattern of holes and web configuration of the information bearing medium being read.

As a hole in the information bearing medium moves between the light source and the reading head, light falls upon the light sensitive surface of the reading head. The intensity of the light varies gradually from a low value to a high value and back to a low value. This occurs because as the hole in the information bearing medium first starts to move between the light source and the reading head, light falls on only a part of the light sensitive surface of the reading head. As the hole in the card moves directly between the light source and the reading head, light falls on the entire light sensitive surface of the reading head. Further movement of the hole past the reading head produces a reduced amount of light falling on the reading head. The resulting output of the reading head accordingly also varies gradually from a low voltage to a high voltage and back again to a low voltage. Thus, it is noted that the waveform generated does not instantly change from one given level to another given level in response to a hole web pattern on the information bearing medium but gradually changes from one level to another level. This gradually changing voltage condition lacks the reliability needed in computer operation where a rapid rise and a rapid fall in voltage is required. The aging characteristics of the light source, photoelectric device and associated electric circuit components vary the output voltage values of the reading head still further and change the characteristics of the information bearing pulses.

Shaper circuits have been developed which convert the gradually changing waveform into rectangular pulses. However, these prior art circuits are sensitive to changes in amplitude of the applied waveform and develop rectangular pulses whose time duration is dependent upon the voltage amplitude of the applied waveform. Thus, these prior art circuits fail to produce a waveform which is a replica of the pattern of holes and web configuration of the information bearing medium being read.

Accordingly, shaper circuits are needed which will produce rectangular pulses having a uniform time duration even when the applied waveform varies in amplitude.

It is therefore, the principal object of the present invention to provide an improved pulse shaper.

Another object of this invention is to provide an improved pulse shaper circuit whose output signal is substantially unaffected by variation in amplitude of the input signal.

The foregoing objects are achieved by providing in a novel combination a collector-coupled transistor trigger circuit, a pair of diodes and a pair of capacitors. A diode is connected between each capacitor and a signal input terminal so that one capacitor is charged to a voltage which is determined by the positive portion of an input signal and the other capacitor is charged to a voltage which is determined by the negative portion of the input signal.

The two capacitors and the signal input terminal are connected to the trigger circuit in a novel manner so that the voltages on the two capacitors plus the input signal determine the time at which the collector-coupled trigger circuit switches from a first state to a second state. The voltage on one of the capacitors plus the input signal determine the time at which the collector-coupled trigger circuit switches from the second state to the first state. Each pulse produced at the output terminal of the collector-coupled trigger circuit has a time duration equal to the time the collector-coupled trigger circuit is in the second state.

The novel manner in which the capacitors and the input terminal are connected to the collector-coupled trigger circuit causes the duration of the pulses produced to be substantially constant for a wide range of signal amplitudes.

Other objects and advantages of the invention will become apparent from the following detailed description when taken in connection with the accompanying drawings, wherein.

Figure 1:
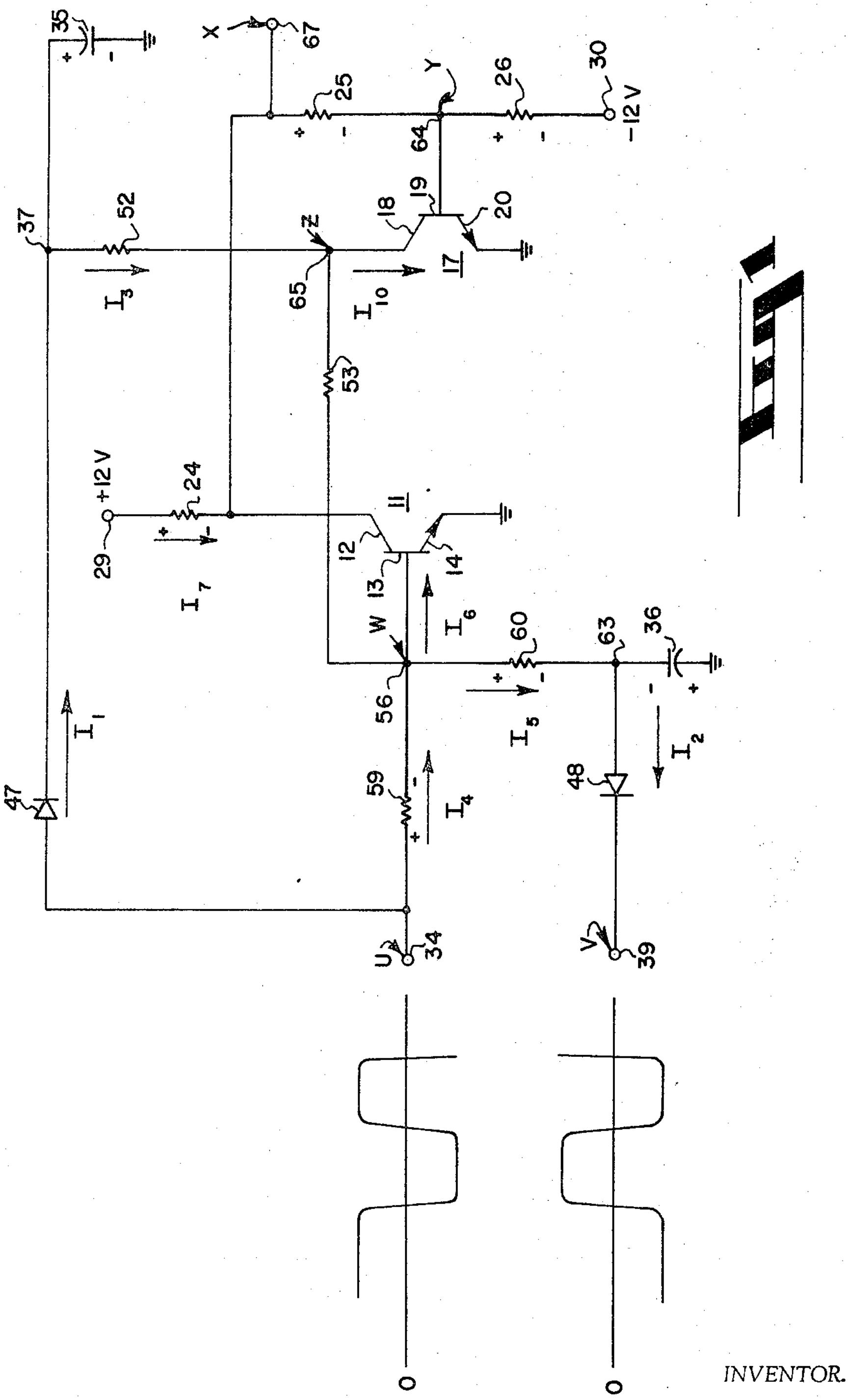
FIG. 1 is a circuit diagram showing an embodiment of the present invention.

The pulse shaper of FIG. 1 comprises a collector-coupled trigger circuit, a pair of capacitors and a pair of diodes. A collector-coupled trigger circuit of the type shown, is a circuit operable in either of two states. The collector-coupled trigger circuit has a signal-input terminal and signal-output terminal. The operating state of the collector-coupled trigger circuit depends upon the amplitude of a trigger signal applied to the signal-input terminal. The collector-coupled trigger circuit operates in a first state as long as a trigger signal greater than a threshold value is applied to the signal-input terminal. When no trigger signal is applied or when a trigger signal less than a threshold value is applied to the signal-input terminal, the collector-coupled trigger circuit operates in a second state. This threshold value depends upon the peak values of the trigger signal previously applied to the signal-input terminal. The collector-coupled trigger circuit of FIG. 1 comprises a transistor 11 having a collector 12, a base 13 and an emitter 14 and a transistor 17 having a collector 18, a base 19 and an emitter 20.

A voltage divider comprising resistors 25 and 26 provides a voltage to render transistor 17 nonconductive when transistor 11 is conductive. Resistors 25 and 26 are connected in series between collector 12 and a terminal 30. A −12 volt source is connected to terminal 30.

For typical operation of the collector-coupled trigger circuit a positive trigger signal of at least +.65 volt is required at base 13 to cause the circuit to operate in the first state. When the circuit is in the first state, transistor 11 is in a condition of high conduction. The voltage at collector 12 is approximately +.2 volt.

When the signal at base 13 is less than a +.65 volt, the circuit operates in the second state. Transistor 11 is nonconductive and the voltage at collector 12 is approximately +9 volts.

Figure 2:
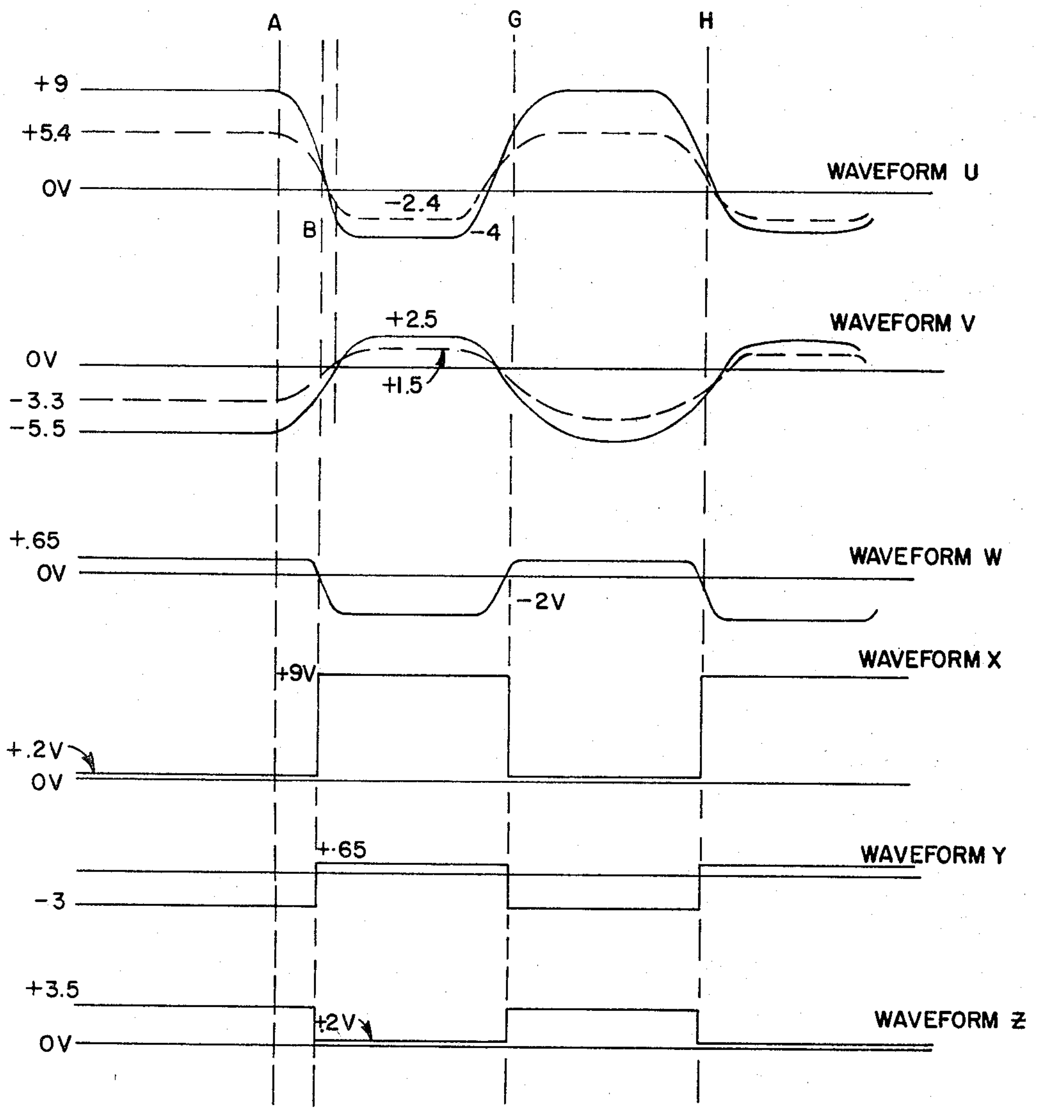
FIG. 2 illustrates waveforms useful in explaining the operation of the present invention.

The value of the voltage at base 13 is determined by a combination of the voltage at a signal-input terminal 34, the voltage across a first energy storage means such as a capacitor 35 and the voltage across a second energy storage means such as a capacitor 36. The voltage across capacitor 35 is determined by the signal received at terminal 34. The voltage across capacitor 36 is determined by the signal received at a signal-input terminal 39. When the signal from a photoelectric reading head is received by the signal-input terminals. the voltage waveform at terminal 34 comprises the waveform shown in waveform U, FIG. 2. The voltage waveform received at terminal 39 is the inverted version of the voltage waveform received at terminal 34. The voltage waveform at terminal 39 is shown in waveform V.

A positive voltage at terminal 34 causes a current to flow through a diode 47 and thereby charges capacitor 35 to the polarity shown in FIG. 1. A negative voltage at terminal 39 causes a current to flow through a diode 48 and thereby charges capacitor 36 to the polarity shown.

Input terminals 34 and 39 may be connected to any source of signal pulses but are particularly provided for connection to a reading head of a card or paper tape reader which photoelectrically senses intelligence placed on information bearing mediums such as cards and tapes. Prior to the time information bearing media pass between the reading head and its light source, the signal at terminal 34 has a maximum positive value, and the signal at terminal 39 has a maximum negative value. This is shown as being prior to time A in FIG. 2.

A web in the information bearing medium passes between the reading head and its light source approximately between time B and time G. A hole in the information bearing medium passes between the reading head and its light source approximately between time G and time H.

Prior to time A (FIG. 2), the positive voltage at terminal 34 causes a current $I_1$ to flow momentarily from terminal 34 through diode 47 to the upper plate of capacitor 35, from the lower plate of capacitor 35 to ground, thereby charging capacitor 35 to the polarity shown in FIG. 1. Current $I_1$ charges capacitor 35 to a voltage substantially equal to the voltage applied to terminal 34. Also prior to time A, the negative voltage at terminal 39 causes a current $I_2$ to flow momentarily from ground to the lower plate of capacitor 36, from the upper plate of capacitor 36 through diode 48 to terminal 39, thereby charging capacitor 36 to the polarity shown in FIG. 1. Current $I_2$ charges capacitor 36 to a voltage substantially equal to the voltage applied to terminal 39.

Also prior to time A, the voltage at junction point 37 causes a current to flow from junction point 37 through resistors 52 and 53 to junction point 56. Current from junction point 56 flows through base 13 to emitter 14 thereby rendering transistor 11 conductive. Thus prior to the time information bearing media pass between the reading head and its light source, transistor 11 is conductive.

Between time A and time B the voltage at terminal 34 decreases to a value less than the voltage across capacitor 35. Diode 47 becomes nonconductive so capacitor 35 does not discharge through diode 47. Also between time A and time B the amplitude of the voltage at terminal 39 decreases to a value less than the voltage across capacitor 36. Diode 48 becomes nonconductive so capacitor 36 does not discharge through diode 48.

Between time A and time B, the voltage on capacitor 35 causes a current $I_3$ to flow from the upper plate of capacitor 35 through resistors 52 and 53 to junction point 56. The input signal causes a current $I_4$ to flow from terminal 34 through a resistor 59 to junction point 56. All of the current which flows to junction point 56 also flows away from junction point 56. Currents $I_3$ and $I_4$ combine to produce a current $I_5$ and a current $I_6$. Current $I_5$ flows from junction point 56 through a resistor 60 to the upper plate of capacitor 36, from the lower plate of capacitor 36 to ground. Current $I_5$ provides the voltage polarity shown across resistor 60. The value of the voltage at junction point 56 is greater than the value of the voltage at junction point 63 by the amount of the voltage drop across resistor 60. Transistors 11 and 17 each require a positive voltage of at least +.65 volt between base and emitter to cause a current to flow from base to emitter. A current from base to emitter renders the transistor conductive. Transistors 11 and 17 each have a positive voltage of approximately +.2 volt between collector and emitter when the transistor is conductive. Between time A and time B, current $I_5$ is large enough so that the voltage at junction point 56 and at base 13 is greater than +.65 volt. This voltage at base 13 causes current $I_6$ to flow from junction point 56 through base 13 and emitter 14 to ground thereby rendering transistor 11 conductive. A current $I_7$ flows from terminal 29 through resistor 24 and collector 12 to emitter 14 of transistor 11. The value of the voltage at collector 12 is approximately +.2 volt when transistor 11 is conducting. Current $I_7$ through resistor 24 provides approximately an 11.8 volt drop across resistor 24. A voltage divider comprising resistors 25 and 26 is connected between collector 12 which has a voltage of +.2 volt and terminal 30 which has a voltage of —12 volts. The voltage at junction point 64 is approximately —3 volts so that transistor 17 is nonconductive. Thus between time A and time B, transistor 11 of the collector-coupled trigger circuit is conductive and transistor 17 is nonconductive. Thus, it has been shown that between time A and time B, the voltage across capacitor 35, the voltage across capacitor 36 and the signal at terminal 34 determine the voltage at junction point 56 and the voltage at base 13 of transistor 11. The voltage at signal output terminal 67 is +.2 volt. Waveform X represents the voltage waveform at terminal 67.

At time B (FIG. 2), the voltage at input terminal 34 has decreased so that current $I_4$, flowing to junction point 56 is considerably less than at time A. Current $I_5$ flowing from junction point 56 through resistor 60 has decreased so that the voltage drop across resistor 60 is no longer great enough to provide a +.65 volt at junction point 56. Thus, transistor 11 no longer has current flow from base 13 to emitter 12 so that transistor 11 is rendered nonconductive. Current $I_7$ no longer flows from terminal 29 through resistor 24 and through transistor 11. A voltage divider comprising resistors 24, 25 and 26 connected between terminals 29 and 30 delivers a voltage of +.65 volt at base 19 thereby causing a current to flow from base 19 to emitter 20 so that transistor 17 is rendered conductive. The voltage divider comprising resistors 24, 25 and 26 also delivers a voltage of +9 volts at output terminal 67 as shown in waveform X.

Between time B and time G, transistor 17 is conductive. A current $I_{10}$ flows from capacitor 35 through resistor 52, collector 18 and emitter 20 to ground. The voltage at collector 18 is approximately +.2 volt when transistor 17 is conductive. Immediately prior to time G the voltage at junction point 65 is approximately equal to the voltage at junction point 56 so that current no longer flows from point 65 to point 56. Immediately prior to time G, only current $I_4$ flows to junction point 56. Thus current $I_5$ is equal to current $I_4$ and the voltage at junction point 56 is determined by the voltage across capacitor 36 and the voltage at terminal 34.

Diode 47 is nonconductive when capacitor 35 is discharging so that discharge time of capacitor 35 is determined by the RC time constant of the circuit loop comprising, basically, capacitor 35 and resistor 52. Diode 43 is nonconductive when capacitor 36 is discharging so the discharge time of capacitor 36 is determined by the RC time constant of the circuit loop comprising, basically, capacitor 36, and resistors 59 and 60 in series. The values of these circuit parameters are made sufficiently large so there is substantially no change in voltage across capacitor 35 or across capacitor 36 during the interval between A and time H.

At time G the voltage at terminal 34 is sufficiently positive so that the voltage at junction point 46 is +.65 volt. Current $I_6$ again flows from base 13 to emitter 14. Current $I_6$ renders transistor 11 conductive and the collector-coupled trigger circuit returns to the first state.

Time B, at which the collector-coupled trigger circuit changes from the first state to the second state, is determined by the voltage at terminal 34, the positive voltage across capacitor 35 and the negative voltage across capacitor 36. Time G, at which the collector-coupled trigger circuit changes from the second state to the first state, is determined only by the voltage at terminal 34 and the negative voltage across capacitor 36. Thus, the voltage at terminal 34 at time G must be more positive than the voltage at terminal 34 at time B, to provide +.65 volt at junction point 56.

If the amplitude of the input signal is reduced as shown in the dashed lines of waveforms U and V, capacitor 35 and capacitor 36 are each charged to a lesser voltage than when the solid line waveform is applied. The smaller voltage across capacitor 35 causes current $I_3$ flowing to junction point 56 to be reduced. The smaller voltage across capacitor 36 causes the voltage at junction point 63 to be less negative than when the solid line waveform is applied. Thus, a smaller value of current $I_5$ is required through resistor 60 to provide sufficient voltage drop across resistor 60 so that the voltage at junction point 56 is +.65 volt. Thus, a smaller positive voltage is required at terminal 34 to cause the voltage at junction point 56 to be a +.65 volt. The duration between time A and time B is sibstantially the same as when the voltage represented by the solid line of waveform U is applied at terminal 34. The voltages across capacitors 35 and 36 provide a dynamic bias so the circuit switches from the first state to the second state when there is a proportionate change in input signal voltage.

The relative values of resistors 59 and 60 can be adjusted so that the trigger circuit switches from the second state to the first state at time G with a predetermined range of values of signals at terminals 34 and 39. The relative values of resistors 52 and 53 can then be adjusted so that the trigger circuit switches from the first state to the second state at time B. Proper adjustment of the values of resistors 59, 60, 52 and 53 cause the time duration from time B to time G to be substantially constant for a wide range of values of signals at terminals 34 and 39. Thus, the duration of the positive pulses at output terminal 67 is essentially constant as shown in waveform X.

In one embodiment of this invention the following circuit parameters were employed:

| | | |
|---|---|---|
| Resistor **52** | ohms | 9000 |
| Resistor **53** | do | 5110 |
| Resistor **59** | do | 4220 |
| Resistor **60** | do | 6190 |
| Capacitor **35** | microfarads | 47 |
| Capacitor **36** | do | 100 |

Thus, the objects set forth herein are realized by the instant invention, wherein a novel arrangement of a collector-coupled trigger circuit, a pair of capacitors and a pair of diodes are employed to provide output pulses having a constant time duration.

While the principles of the invention have now been made clear in an illustrative embodiment, there will be immediately obvious to those skilled in the art many modifications of structure, arrangement, proportions, the elements, materials, and components, used in the practice of the invention, and otherwise, which are particularly adapted for specific environments and operating requirements without departing from those principles. The appended claims are therefore intended to cover and embrace any such modifications, within the limits only of the true spirit and scope of the invention.

What is claimed is:

1. A pulse shaper for use with a source of electrical signal pulses comprising: first and second transistors each having a base, a collector and an emitter; means for cross-coupling said first and second transistors to form a trigger circuit having two states of operation; and an energy storage means, said storage means being adapted to receive said pulses, said pulses providing a voltage on said storage means, the value of said voltage being determined by the level of said pulses, said storage means being coupled to said base of said first transistor, said base of said first tranistor being adapted to receive said pulses, said trigger circuit delivering rectangular pulses each having a predetermined time duration in response to the combination of said voltage and said pulses.

2. A pulse shaper for use with a source of electrical signal pulses comprising: first and second transistors each having a base, a collector and an emitter; means for cross-coupling said first and second transistors to form a collector-coupled trigger circuit; and an energy storage means, said storage means being adapted to receive said pulses, said pulses providing a voltage on said storage means, the value of said voltage being determined by the level of said pulses, said storage means being coupled to said base of said first transistor, said base of said first transistor being adapted to receive said pulses, said trigger circuit delivering rectangular pulses each having a predetermined time duration in response to the combination of said voltage and said pulses.

3. A pulse shaper for use with a source of electrical signal pulses comprising: first and second transistors each having a base, a collector and an emitter; means for cross-coupling said first and second transistors to form a collector-coupled trigger circuit; a capacitive storage means; and a diode, said storage means being coupled to said diode, said diode being adapted to receive said signals and to deliver a voltage to said storage means, said voltage being determined by the level of said signals, said storage means being coupled to said base of said first transistor, said base of said first transistor being adapted to receive said signals, said trigger circuit delivering rectangular pulses each having a predetermined time duration in response to the combination of said voltage and said signals.

4. A pulse shaper for use with a source of electrical signals comprising: first and second transistors each having a base, a collector and an emitter; means for cross-coupling said first and second transistors to form a collector-coupled trigger circuit; first and second energy storage means; first and second input terminals, said first and second terminals being adapted for connection to said source of signals; means for coupling said first terminal to said first storage means; means for coupling said second terminal to said second storage means; resistive means connecting said second storage means to said base of said first transistor; resistive means connecting said first storage means to said collector of said second transistor; resistive means connecting said first terminal to said base of said first transistor; and an output terminal, said output terminal being connected to said collector of said first transistor.

5. A pulse shaper for use with a source of electrical signals comprising: first and second transistors each having a base, a collector and an emitter; means for cross-coupling said first and second transistors to form a trigger circuit having two states of operation; first and second energy storage means; first and second input terminals, said first and second terminals being adapted for connection to said source of signals; means for coupling said first terminal to said first storage means; means for coupling said second terminal to said second storage means; coupling means connecting said second storage means to said base of said first transistor; coupling means connecting said first storage means to said collector of said second transistor; coupling means connecting said first terminal to said base of said first transistor; and an output terminal, said output terminal being connected to said collector of said first transistor.

6. A pulse shaper for use with a source of electrical signals comprising: first and second transistors each having a base, a collector and an emitter; means for cross-coupling said first and second transistors to form a circuit having two states of operation; first and second energy storage means; first and second diodes; first and second input terminals, said first and second terminals being adapted for connection to said source of signals, said first diode being connected between said first terminal and said first storage means, said second diode being connected between said second terminal and said second storage means; resistive means connecting said second storage means to said base of said first transistor; resistive means connecting said first storage means to said collector of said second transistor; resistive means connecting said first terminal to said base of said first transistor; and an output terminal, said output terminal being connected to the collector of one of said first and second transistors.

7. A pulse shaper for use with a source of electrical signals comprising: first and second transistors each having a base, a collector and an emitter; means for cross-coupling said first and second transistors to form a collector-coupled trigger circuit; first and second energy storage means; first and second diodes; first and second input terminals, said first and second terminals being adapted for connection to said source of signals, said first diode being connected between said first terminal and said first storage means, said second diode being connected between said second terminal and said second storage means; resistive means connecting said second storage means to said base of said first transistor; resistive means connecting said first storage means to said collector of said second transistor, resistive means connecting said first terminal to said base of said first transistor; and an output terminal, said output terminal being connected to the collector of one of said first and second transistors.

8. A pulse shaper for use with a source of electrical signals comprising: first and second transistors each having a base, a collector and an emitter; means for cross-coupling said first and second transistors to form a circuit having two states of operation; first and second capacitive storage means; first and second diodes; first and second input terminals, said first and second terminals being adapted for connection to said source of signals, said first diode being connected between said first terminal and said first storage means, said second diode being connected between said second terminal and said second storage means; resistive means connecting said second storage means to said base of said first transistor; resistive means connecting said first storage means to said collector of said second transistor; resistive means connecting said first terminal to said base of said transistor; and an output terminal, said output terminal being connected to said collector of said first transistor.

9. A pulse shaper for use with a source of electrical signals comprising: first and second transistors each having a base, a collector and an emitter; first, second and third reference potentials, said emitters of said first and second transistors being connected to said first potential, said collector of said first transistor being resistively coupled to said second potential, said base of said second transistor being resistively coupled to said third potential, said collector of said first transistor being resistively coupled to said base of said second transistor; first and second signal input terminals, said terminals being adapted to receive said signals; resistive means coupling said first terminal to said base of said first transistor; first and second diodes; first and second capacitive storage means, said first diode being connected between said first input terminal and said first storage means, said second diode being connected between said second input terminal and said second storage means, said second storage means being resistively coupled to said base of said first transistor, said first storage means being resistively coupled to said collector of said second transistor, said collector of said second transistor being resistively coupled to said base of said first transistor; and an output terminal, said output terminal being connected to said collector of said first transistor.

10. A pulse shaper for use with a source of electrical signals comprising: first and second transistors each having a base, a collector and an emiter; first, second and third reference potentials, said emitters of said first and second transistors being connected to said first potential, said collector of said first transistor being resistively coupled to said second potential, said base of said second transistor being resistively coupled to said third potential; first, second, third, fourth and fifth resistors, said first resistor being connected between said collector of said first transistor and said base of said second transistor; first and second signal input terminals, said terminals being adapted to receive said signals, said second resistor being connected between said first terminal and said base of said first transistor; first and second diodes; first and second capacitors each having first and second terminals, said first terminals of said first and said second capacitors being connected to said first potential, said first diode being connected between said first input terminal and said second terminal of said first capacitor, said second diode being connected between said second input terminal and said second terminal of said second capacitor, said third resistor being connected between said second terminal of said second capacitor and said base of said first transistor; said fourth resistor being connected between said second terminal of said first capacitor and said collector of said second transistor; said fifth resistor being connected between said collector of said second transistor and said base of said first transistor; and an output terminal, said output terminal being connected to said collector of said first transistor.

References Cited

UNITED STATES PATENTS 3,018,384 1/1962 Zrubek ............ 307—88.5

JOHN S. HEYMAN, *Primary Examiner.*

ARTHUR GAUSS, *Examiner.*

R. H. EPSTEIN, *Assistant Examiner.*